United States Patent

[11] 3,569,725

| [72] | Inventor | Edgar N. Rosenberg<br>San Diego, Calif. |
|---|---|---|
| [21] | Appl. No. | 9,709 |
| [22] | Filed | Feb. 9, 1970 |
| [45] | Patented | Mar. 9, 1971 |
| [73] | Assignee | The United States of America as represented by the Secretary of the Navy |

[54] WAVE-ACTUATED POWER GENERATOR-BUOY
7 Claims, 3 Drawing Figs.

[52] U.S. Cl. .................................................... 290/53,
290/42, 417/333, 417/521
[51] Int. Cl. ..................................................... F03b 13/12
[50] Field of Search ......................................... 290/42, 43,
53, 54; 417/61, 100, 330, 331, 332, 333, 337, 525, 521

[56] References Cited
UNITED STATES PATENTS
| 855,258 | 5/1907 | Neal ............................. | 417/332 |
| 886,931 | 5/1908 | Bosworth ..................... | 417/333 |
| 988,508 | 4/1911 | Reynolds ...................... | 290/42X |
| 3,515,889 | 6/1970 | Kammerer ..................... | 290/53 |

*Primary Examiner*—G. R. Simmons
*Attorneys*—Richard S. Sciascia, Ervin F. Johnston and Thomas G. Keough ABSTRACT: An oceanographic buoy having a self-sustaining power supply includes an elongate framework provided with a flotation section and a ballasting section predetermined to maintain the buoy in a vertical position. A pressure chamber carried on the buoy is fed water by a plurality of equaldistantly, circumferentially disposed pumping assemblies and passes the water, under pressure, to a hydroelectric transducer driving a transmitter. The transmitter relays information, representative of a monitored phenomena, or, merely radiates high energy electromagnetic signals enabling the precise location of the buoy by a remotely disposed tracking station. High reliability stems from the overall simplicity of the oceanographic buoy which is primarily dependent on the configuration and orientation of the several pumping assemblies that individually require a minimum amount of sealing and linkage elements.

PATENTED MAR 9 1971

*INVENTOR.*
EDGAR N. ROSENBERG

BY

THOMAS G. KEOUGH
ERVIN F. JOHNSTON

*ATTORNEYS*

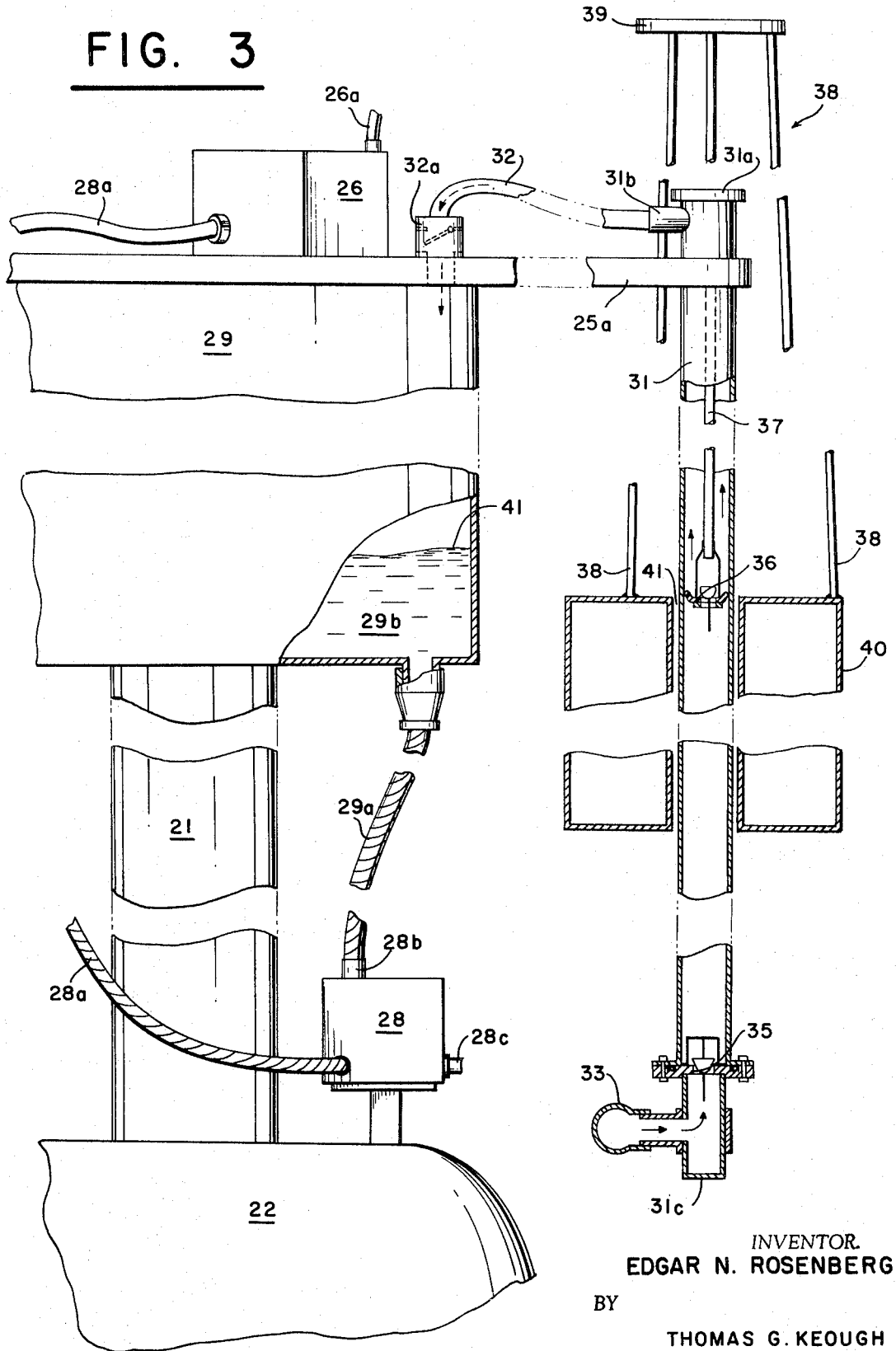

WAVE-ACTUATED POWER GENERATOR-BUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Oceanographic buoys, for scientific research or for use as navigational aids, must regularly be attended to gather data or to replace the electric power pack used to power onboard electronics. In the case of the buoys used for navigational aids, power demands are high and contemporary power sources are simply inadequate in the respect that frequent replacement is necessitated. Although several attempts have been made in providing wave-actuated power sources, all have proven to be generally unacceptable, since existing wave powered mechanisms are prone to failure and are prohibitively expensive. Due to the complexity of currently operational buoys, especially the unmoored type, used to monitor, for example, ocean currents, many are lost as well as is the irreplaceable data when retrieval of the buoys is a prerequisite to obtaining the data.

SUMMARY OF THE INVENTION

The present invention is directed to providing an oceanographic buoy having a self-sustaining power supply including a generally elongate framework having a buoying section and a dependent section in the form of either a weight or mooring line for orienting the buoy in a vertical disposition. A pressure chamber feeding pressurized water to a water driven turbine connected to an electric generator receives pressurized water from a plurality of circumferentially, equaldistantly spaced pumping assemblies drawing filtered intake water from the surrounding ocean passing water to the interior of the pressure chamber. Electric power generated is coupled to a transmitter which is thusly enabled to transmit data signals originating from suspended monitoring devices to an antenna, a beacon, or audio device.

Therefore, a primary object of the instant invention is to provide a self-sustained oceanographic buoy requiring little supervision.

Yet another object is to provide an oceanographic buoy having an automatic monitored data relay capability.

Still another object is to provide an oceanographic buoy having high reliability due to the simplicity in electrical power generation machinery.

These and other objects of the invention will become readily apparent from the ensuing description when taken with the drawings.

BRIEF DESCRIPTION OF THE DRAWINGS

FIG. 3 is a partial cross-sectional view of the invention taken generally along lines 3-3 in FIG. 2.

DESCRIPTION OF THE PREFERRED EMBODIMENT

Figure 1:
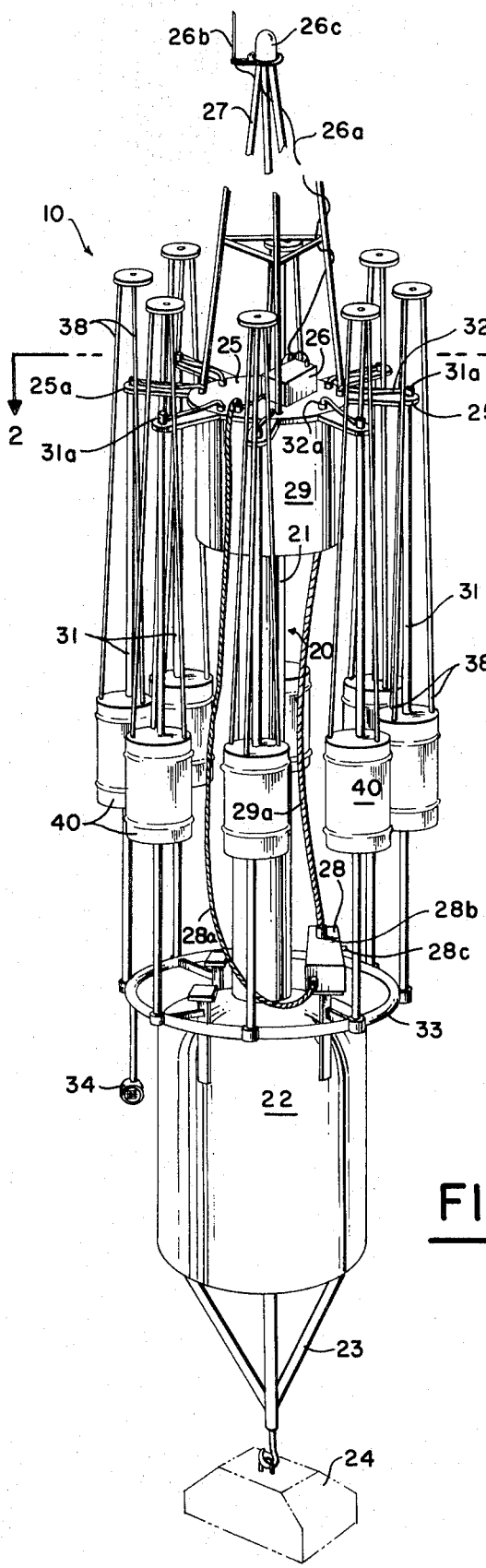
FIG. 1 is an isometric view of the invention operatively disposed.
Figure 2:
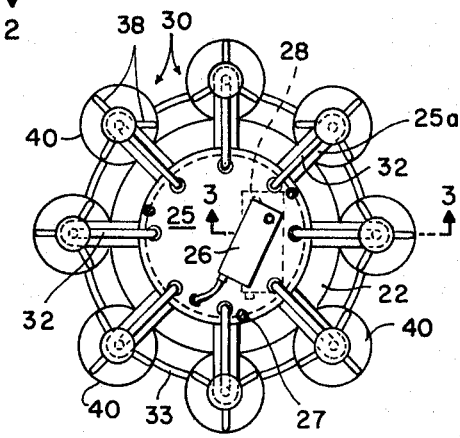
FIG. 2 is a top view of the invention taken generally along lines 2-2 in FIG. 1.

Referring now to the drawings, a buoy 10 carrying a wave-actuated power generator includes, as major components, an essentially elongate framework 20 supporting, in the representative embodiment, eight pumping assemblies 30 equaldistantly, circumferentially disposed about the framework.

The elongate framework is formed of a tubular strut member 21 secured to a buoying section 22 maintained below the area of surface wave turbulence. The strut member is optionally a skelatal frame to minimize surface wave interaction. The buoying section is either an evacuated chamber or a chamber filled with a flotation material to eliminate the possibility that the buoy may be sunk if the chamber is ruptured.

A keellike triangular frame 23 depends from the buoying section and is secured to a weight 24, or optionally, a mooring line when the buoy is anchored at a preselected location.

At the opposite end of the tubular member, an instrumentation platform 25 horizontally defines a mounting surface for an electronics package 26 and a beacon-antenna mounting truss 27. The package in the form of a preprogrammed, timed radio transmitter, relays data obtained from, for example, a plurality of suspended thermistors 26a, current meters, salinity meters, or wind and wave velocity gauges, to the antenna 26b or to the beacon light 26c. The electronics package is, in the alternative, a transponder, actuated upon the reception of a remotely originating interrogation signal to either relay a coded signal or to provide a preprogrammed data output.

Transmitting power for electronics package 26 is produced in a water turbine-driven electric power generator 28 and transferred via an input power lead 28a. Since generation of electric power by the driven power generator occurs when there is ambient wave action, as explained below, it is desirable to include, either on instrumentation platform 25 or as an internal component of power generator 28, a bank of storage batteries to provide a continuous operational capability especially where the buoy's overall purpose is to function as a transponder, for example.

Water pressure driving potential for the turbine-driven power generator is created in pressuretight chamber 29 coaxially disposed upon the upward portion of the elongate framework. A feeder hose 29a connects water 29b, under pressure to an input fitting 28b of the turbine-driven power generator. A hydrostatic, pressure-responsive switch carried in the input fitting bypasses water when the pressure attains a sufficient level and blocks the passage of water when the pressure falls below a lower pressure level to ensure efficient operation of the generator. After the pressurized water has been fed through the turbine section of the power generator, the water is vented through an outlet fitting 28c into the ocean. Since there is a wide variety of pressure responsive switches, water turbines, and sealed turbine-driven electric power generator combinations, elaboration on the specific details of construction is not presented for any person skilled in the art will choose from a variety of suitable mechanisms.

One of the signal features of the invention resides in the fact that automatic, unattended, continuous operation in a desired mode is permitted by including highly reliable pumping assemblies 30 passing water for driving the turbine-driven electric power generator. Radially, outwardly extending arms 25a are shaped with a lateral bore securely gripping the outer surface of an elongate, tubular cylinder 31. Each of the cylinders has a top, capped end 31a and a laterally extending outlet fitting 31b joining the interior of each cylinder in fluid communication with a hoselike duct 32 each terminating in a unidirectional flow fitting 32a.

At the opposite end of each cylinder, an annular-shaped tube 33 receiving surrounding ocean water through a filter section 34 feeds the water to the interior of each cylinder simultaneously through an opening adjacent a closed end 31c. Preferably, immediately above the opening, a one-way valve 35 is securely contained in the cylinder to ensure a unidirectional flow of water. The one-way valve may be mounted further up the cylinder but from an installation and maintenance standpoint, lower mounting is better.

A piston member 36, incorporating a one-way valve, is longitudinally spaced in each cylinder and is sized to fit within the cylinder in a slidable, sealed manner to "pull upward" a slug of water each time it is reciprocably displaced. A long pushrod 37 imparts the reciprocal displacement to the piston, axially upwardly toward capped end 31a.

Displacement of the pushrod is provided by a triangular frame 38 terminating at its apex in a disc-shaped element 39 secured to the outwardmost extension of pushrod 37. The opposite ends of the triangular frame are welded or otherwise secured to the upward surface of a "barrel-shaped" float 40. The barrels are provided with an axially extending bore 41, having a diameter slightly in excess of the outside diameter of the elongate cylinders to permit a longitudinal reciprocal motion being guided and held from random motion by the outer surface of the cylinders. Having the floats hollow or filled with a flotation material causes the reciprocal displacement of the float, its interconnected triangular frame, the pushrod and piston to pump water fed to the interior of the cylinder from the annular tube 33.

Wave action buoys up the plurality of floats to effect the reciprocal displacement of their connected pistons and an unsupervised water evacuation operation progresses. In a typical embodiment of the invention, the pumps expel water past each outwardmost fitting 31b to the exterior of the elongate cylinder at a rate in excess of ½ gallon per stroke. With all eight floats displacing their interconnected pistons, over four gallons of water are evacuated per wave. Once the wave-actuated generator-buoy starts operating, no further attention need be given until the buoy is removed from the water. Construction of the generator-buoy must take into consideration its operational environment, the sea. Noncorrosive materials and corrosion inhibiting coatings must be employed wherever possible to ensure the long operational life guaranteed by the disclosed superior design. Pad eyes for towing and mooring must be included but have not been shown for the sake of simplicity in the drawings.

The one-way valve carried on the piston and the one-way valve 35 allow only a unidirectional flow while an annular seal carried about the pushrod in capped end 31a prevents water and air pressure loss. Pumped water is thusly transferred through duct 32 through the unidirectional flow fitting 32a to the interior of the chamber. As more water is pumped into the interior, the trapped air is compressed and creates a hydrostatic pressure hydraulically transferred to the pressure responsive switch carried in input fitting 28b. The input fitting bypasses water 29b, under pressure through the turbine and electric power is generated.

Obviously, many modifications and variations of the present invention are possible in the light of the above teachings, and, it is therefore understood that within the scope of the disclosed inventive concept, the invention may be practiced otherwise than as specifically described.

I claim:

1 An oceanographic buoy having a self-sustaining power supply comprising:
  means defining an elongate framework having a buoying section and a dependent section constructed to orient said buoy in a vertical disposition;
  means enclosing a pressure chamber having a valved dorsally carried liquid inlet fitting and a ventrally carried liquid outlet fitting both communicating with said pressure chamber;
  a plurality of pumping assemblies circumferentially mounted on said elongate framework each including:
    an elongate cylinder having an intake orifice at its lower end and a water transfer opening buoyed above the surface of the water;
    a reciprocable pump piston carried in said cylinder;
    a pushrod connected to said piston coaxially reaching from said elongate cylinder in a reciprocably sealed relationship;
    a float provided with a traverse bore configured for guiding said float in a reciprocable, slidable motion along the outer surface of said cylinder;
    a follower connected to the outwardmost extension of said pushrod being sized to keep said float slidably adjacent within the extreme limits of said outer surface during said longitudinal motion; and
    a feeder duct connecting each said water transfer opening to said pressure chamber having a one-way valve interposed therein;
  a hydroelectric transducer receiving pressurized water from said pressure chamber for generating electrical power; and
  means responsive to said electrical power to generate a source of radiation of energy.

2. An oceanographic buoy according to claim 1 in which said elongate framework is configured to present a minimal lateral resistance to surface waves.

3. An oceanographic buoy according to claim 2 further including ocean monitoring devices carried by said elongate framework coupled to the responsive means to radiate signals representative of monitored phenomena.

4. An oceanographic buoy according to claim 3 further including means for radiating said automatic radiation being substantially coaxially disposed.

5. An oceanographic buoy according to claim 4 further including an annular bracket carried on said buoying section enclosing a filtered duct supporting all said pumping assemblies and feeding water to all the intake orifices.

6. An oceanographic buoy according to claim 5 in which each said float is a barrel-shaped cylinder and said traverse bore is coaxially disposed and said follower is essentially a tripod-shaped truss having its apex secured to the upward facing surface of each said barrel-shaped cylinder.

7. An apparatus according to claim 6 in which said hydroelectric transducer is a water turbine driving electrical generator, the responsive means is a radio transmitter, and the radiating means is an antennaflasher combination.